(12) United States Patent
Mukherjee et al.

(10) Patent No.: US 9,567,215 B2
(45) Date of Patent: *Feb. 14, 2017

(54) METHOD FOR PRODUCING HYDROGEN AND/OR OTHER GASES FROM STEEL PLANT WASTES AND WASTE HEAT

(71) Applicant: Tata Steel Limited, Jamshedpur (IN)

(72) Inventors: Tridibesh Mukherjee, Jamshedpur (IN); Debashish Bhattacharjee, Jamshedpur (IN)

(73) Assignee: Tata Steel Limited, Jamshedpur (IN)

( * ) Notice: Subject to any disclaimer, the term of this patent is extended or adjusted under 35 U.S.C. 154(b) by 33 days.

This patent is subject to a terminal disclaimer.

(21) Appl. No.: 14/865,160

(22) Filed: Sep. 25, 2015

(65) Prior Publication Data

US 2016/0023896 A1    Jan. 28, 2016

Related U.S. Application Data

(63) Continuation of application No. 12/088,579, filed as application No. PCT/IN2006/000232 on Jul. 4, 2006, now abandoned.

(30) Foreign Application Priority Data

Sep. 30, 2005   (IN) .................................. 900/KOL/05

(51) Int. Cl.
*C01B 3/00*    (2006.01)
*C01B 3/06*    (2006.01)
(Continued)

(52) U.S. Cl.
CPC ................. *C01B 3/06* (2013.01); *C01B 3/042* (2013.01); *C01B 3/348* (2013.01); *C01B 31/18* (2013.01); *C04B 5/00* (2013.01); *C10J 3/57* (2013.01); *C10J 3/82* (2013.01); *C21B 3/08* (2013.01); *C22B 7/04* (2013.01); *C10J 2300/093* (2013.01); *C10J 2300/0943* (2013.01); *C10J 2300/0946* (2013.01); *C10J 2300/0973* (2013.01); *C10J 2300/0976* (2013.01); *C10J 2300/12* (2013.01);
(Continued)

(58) Field of Classification Search
USPC ...................................................... 423/658.2
See application file for complete search history.

(56) References Cited

U.S. PATENT DOCUMENTS 2,908,737 A    10/1959  Dominicis
3,083,957 A    4/1963   Langer et al.
(Continued)

FOREIGN PATENT DOCUMENTS

JP    55120696 A    9/1980
JP    5688494 A     7/1981
(Continued)

*Primary Examiner* — Melvin C Mayes
*Assistant Examiner* — Kenneth Vaden
(74) *Attorney, Agent, or Firm* — The Webb Law Firm

(57) ABSTRACT

A method for producing hydrogen and/or other gases from steel plant wastes and waste heat is disclosed. The method comprises the steps of providing molten waste from steel plant like molten slag in a reactor. The molten slag is contacted with water and/or steam in the presence of a reducing agent to form a stream of hydrogen and/or other gases. The hydrogen and/or other gases can then be extracted from the stream of gases from the reactor.

19 Claims, 1 Drawing Sheet

(51) Int. Cl.
*C01B 3/04* (2006.01)
*C01B 3/34* (2006.01)
*C01B 31/18* (2006.01)
*C04B 5/00* (2006.01)
*C10J 3/57* (2006.01)
*C21B 3/08* (2006.01)
*C22B 7/04* (2006.01)
*C10J 3/82* (2006.01)

(52) U.S. Cl.
CPC ..... *C10J 2300/16* (2013.01); *C10J 2300/1807* (2013.01); *Y02E 60/364* (2013.01); *Y02P 10/212* (2015.11); *Y02P 10/265* (2015.11); *Y02P 10/283* (2015.11); *Y02P 20/129* (2015.11)

(56) References Cited

U.S. PATENT DOCUMENTS

| | | |
|---|---|---|
| 3,205,810 A | 9/1965 | Rosenak |
| 3,421,869 A | 1/1969 | Benson |
| 3,460,934 A | 8/1969 | Kelmar |
| 3,615,298 A | 10/1971 | Benson |
| 3,709,997 A | 1/1973 | Medovar et al. |
| 3,761,243 A | 9/1973 | Kuntz et al. |
| 3,787,193 A | 1/1974 | Seglin et al. |
| 3,979,551 A | 9/1976 | Overmyer et al. |
| 4,120,663 A | 10/1978 | Fally |
| 4,222,768 A | 9/1980 | Suyama |
| 4,389,246 A | 6/1983 | Okamura et al. |
| 4,561,886 A * | 12/1985 | Geskin ............ C10J 3/57 266/138 |
| 4,696,680 A | 9/1987 | Ghate et al. |
| 4,720,261 A | 1/1988 | Fishwick et al. |
| 5,004,495 A | 4/1991 | Labate |
| 5,066,476 A | 11/1991 | Wetzel et al. |
| 5,211,774 A | 5/1993 | Garde et al. |
| 6,196,479 B1 | 3/2001 | Edlinger |
| 6,685,754 B2 * | 2/2004 | Kindig ............ B01J 7/00 252/372 |
| 9,346,675 B2 * | 5/2016 | Bhattacharjee ......... C01B 3/042 |
| 2002/0098394 A1 | 7/2002 | Keefer et al. |
| 2003/0056438 A1 | 3/2003 | Garnier et al. |
| 2003/0089481 A1 | 5/2003 | Moore et al. |
| 2007/0107466 A1 | 5/2007 | Vuletic |
| 2010/0111826 A1 | 5/2010 | Bhattacharjee et al. |

FOREIGN PATENT DOCUMENTS

| | | |
|---|---|---|
| JP | 6183653 | 4/1986 |
| JP | 63103016 | 7/1988 |
| JP | 200636804 A | 2/2006 |
| WO | 2004065641 A1 | 8/2004 |
| WO | 2005031008 A1 | 4/2005 |

* cited by examiner

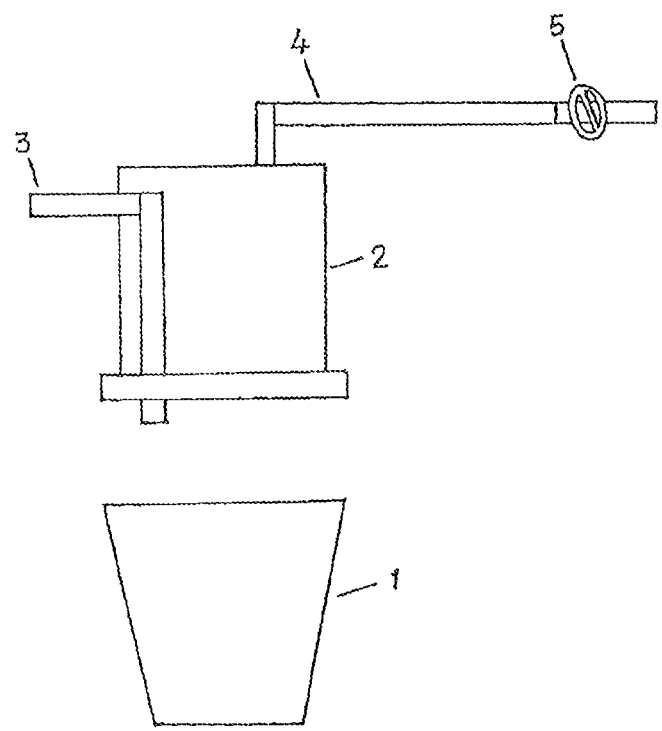

METHOD FOR PRODUCING HYDROGEN AND/OR OTHER GASES FROM STEEL PLANT WASTES AND WASTE HEAT

CROSS REFERENCE TO RELATED APPLICATIONS

This application is a Continuation of U.S. patent application Ser. No. 12/088,579 filed on Dec. 31, 2008, now abandoned, which is the U.S. national phase of PCT/IN2006/000232 filed on Jul. 4, 2006, which claims priority to Indian Patent Application NO. 900/KOL/05 filed on Sep. 30, 2005, the disclosure of which are hereby incorporated in their entirety by reference.

BACKGROUND OF THE INVENTION

Field of the Invention

The present invention relates generally to a method for producing hydrogen and/or other gases from steel plant wastes and waste heat.

Description of Related Art

With the increasing use and depletion of non-renewable sources of energy, such as petroleum, natural gas and coal, hydrogen is being increasingly looked upon as a viable alternative fuel. Quite a few processes exist for separation and collection of hydrogen gas. Among these the most popular are electrolysis and the use of high temperature nuclear reactors or petroleum processing plants to split water ($H_2O$) into hydrogen and oxygen. These processes are expensive as they involve use of electricity or other chemicals such as sulphuric acid, hydrogen iodide, metallic zinc and zinc oxide, which need closed-loop regeneration and handling. This makes the production of hydrogen a costly process.

In the steel plant the generated wastes, like molten slag from basic oxygen converters called LD slag, at a temperature of about 1600° C. to 1700° C., are dumped into pits for removal and further processing. In the present invention, the heat of this waste material can be used for the production of a gas stream comprising hydrogen gas or hydrogen and carbon monoxide.

SUMMARY OF THE INVENTION

The main object of the present invention, therefore, is to use the heat of steel plant wastes, like molten slags, for generating hydrogen by splitting water and/or steam, or a mixture of the two in the presence of a reducing agent.

Another object of the present invention is to use the heat of steel plant waste for generating hydrogen, carbon monoxide and/or other gases by splitting water or steam or a mixture of the two in the presence of a carbonaceous material.

Water splits into hydrogen and oxygen at 1800° K, i.e., at 1527° C. In the present invention, water and/or steam can be split into hydrogen and oxygen by using heat available in steel plant wastes like molten slags.

The waste material of molten slag may comprise steel making slag, such as desulphurisation, converter, electric arc furnace (EAF), blast furnace slags, ferrochrome and ferromanganese slags from a submerged arc furnace (SAF), or a mixture of these slags.

Water and/or steam is contacted with molten slag in the presence of reducing agents in a reactor, like, for example, a carbonaceous material.

Presence of FeO and/or other reducing agents such as carbon in the form of coal, coke or refractory blocks enhance the process of hydrogen generation. At the operating temperature (above 1500° C.), it is still possible for hydrogen to recombine with oxygen to form water. However, FeO present in the slag reacts with the oxygen to form higher valence oxides such as $Fe_2O_3$ and $Fe_3O_4$.

The thermodynamic activity of oxygen in the immediate vicinity of slag is reduced, thus, reducing the chances of recombination of hydrogen and oxygen.

Presence of strong deoxidizers, such as carbon (in the form of coal, coke, or graphite blocks), enhance the kinetics of removal of oxygen, further improving the efficiency of the hydrogen generation process. Waste materials as reducing agents, like carbonaceous materials, are abundantly available in steel plants for use in this process to assist the generation of hydrogen by contacting water and/or steam with molten slag in the presence of a reducing agent in the reactor.

Thus, the present invention provides a method for producing hydrogen and/or other gases from steel plant wastes and waste heat, comprising the steps of providing molten waste from a steel plant, like molten slag, in a reactor; contacting the molten slag with water and/or steam in the presence of a reducing agent to form a stream of hydrogen and/or other gases; and extracting hydrogen and/or other gases from said stream.

BRIEF DESCRIPTION OF THE DRAWING

The invention can now be described in detail with the help of the FIGURE of the accompanying drawing in which:

FIG. 1 is a schematic representation of a system for producing a stream of gases using steel plant wastes and their waste heat in accordance with the present invention.

DESCRIPTION OF THE INVENTION

Water and/or steam is sprayed on LD slag, or other steel plant wastes having a temperature above 1600° C. The waste is either static, for example, in a static reactor or a ladle or a pot 1 or on ground or moving (e.g., being poured or in fluid motion down a slope or on a conveyor). The water sprayed through a water line 3 immediately splits when it comes in contact with the hot slag. The emanating gases are funneled through a hood 2 placed over the area and collected using a gas collection pipe 4.

The preferred temperature of the molten slag in the reactor is greater than about 1250° C. when water is sprayed into the molten slag.

The oxygen generated from splitting the water will react with the carbon present forming carbon monoxide. The gas stream comprising hydrogen and carbon monoxide can then be collected from the reactor.

In the present invention, the production of a gas stream comprises hydrogen and carbon monoxide in the volume ratio of between 1:0.2 to 1:1.

The gas stream produced in the reactor comprises at least 10 volume percent of hydrogen gas and not greater than about 15 volume percent of carbon dioxide.

In another embodiment, the extracted gas stream may comprise hydrogen and carbon monoxide in the ratio of 1:1 to about 8:1.

The water present may be extracted from the gas stream for recycling.

The water is contacted with the molten slag in the reactor by spraying water using a spray nozzle. Steam can also be injected into the molten slag in the reactor, using a lance.

The reducing agent or the carbonaceous material can be injected into the molten slag in the reactor along with the water and/or steam.

The carbonaceous material to be injected into the molten slag may comprise material selected from a group consisting of coal, coke, steel plant waste, municipal waste, and coal mine waste. The ratio of water to carbonaceous material injected may be from about 1:0.1 to 1:1.

For promoting the formation of hydrogen, a flux may be added to the molten slag and the carbonaceous material.

From the stream of hydrogen and/or other gases produced by the method of the present invention, the hydrogen and carbon monoxide can be separated.

The use of steel plant wastes and their waste heat is a cost effective method for generation of hydrogen or hydrogen and carbon monoxide. 90 million tons of LD slag produced annually can be a major source for supply of hydrogen gas worldwide.

The invention claimed is:

1. A method for producing hydrogen and/or other gases from steel plant wastes and waste heat, comprising the steps of:
    removing molten slag from a steelmaking process as a waste product, wherein the molten slag is removed from the steelmaking process while in a heated condition such that the temperature of the removed molten slag is a waste heat of the steelmaking process;
    placing a hood over the removed molten slag that is in the heated condition, wherein the hood includes a water line;
    spraying, with water and/or steam from the water line, a surface of the removed molten slag while in the heated condition and in the presence of a reducing agent to use the waste heat available in the removed molten slag to form a stream of gases including hydrogen gas and carbon monoxide;
    passing the stream of gases through the hood; and
    separating hydrogen gas from the stream of gases passed through the hood,
    wherein a flux is added to the molten slag and the reducing agent for promoting the formation of hydrogen.

2. The method of claim 1, wherein the molten slag comprises blast furnace slag, desulphurization slag of steelmaking, converter slag of steelmaking, ferrochrome or ferromanganese slag in submerged arc furnace (SAF), or a mixture thereof.

3. The method of claim 1, wherein the temperature of the molten slag when contacted with water and/or steam is greater than 1250° C.

4. The method of claim 1, wherein said stream of gases includes carbon monoxide gas, and further comprising the step of separating carbon monoxide gas from said stream.

5. The method of claim 1, further comprising the step of extracting water from said stream for recycling.

6. The method of claim 1, wherein the volume ratio of hydrogen and carbon monoxide produced is from 1:0.2 to 1:1.

7. The method of claim 1, wherein the gas stream comprises at least 10 volume percent of hydrogen.

8. The method of claim 1, wherein the gas stream comprises not greater than 15 volume percent carbon dioxide.

9. The method of claim 1, wherein the gas stream comprises a ratio of hydrogen to carbon monoxide of about 1:1 to 8:1.

10. The method of claim 1, wherein the reducing agent is a carbonaceous material.

11. The method of claim 10, wherein the carbonaceous material comprises coal, coke, steel plant waste, municipal waste, and coal mine waste.

12. The method of claim 10, wherein the ratio of water to carbonaceous material is between 1:0.1 to 1:1.

13. The method of claim 1, wherein the removed molten slag is static during the production of the stream of gasses.

14. The method of claim 13, wherein the removed molten slag is in a ladle.

15. The method of claim 13, wherein the removed molten slag is in on the ground.

16. The method of claim 1, wherein the removed molten slag is moving during the production of the stream of gasses.

17. The method of claim 16, wherein the removed molten slag is being poured.

18. The method of claim 16, wherein the removed molten slag is in fluid motion down a slope.

19. The method of claim 16, wherein the removed molten slag is on a conveyor.

* * * * *